United States Patent
Hudak et al.

(10) Patent No.: US 11,816,163 B2
(45) Date of Patent: *Nov. 14, 2023

(54) SYSTEMS AND METHODS FOR IMPROVED TRANSACTIONAL MAINFRAMES

(71) Applicant: Capital One Services, LLC, McLean, TX (US)

(72) Inventors: Marc Hudak, Plano, TX (US); Swathi Challkere Vijayaprakash, Frisco, TX (US); Matthew Coleman, Dallas, TX (US); Ashish Bassi, Oakville (CA); Anurag Andoji, Frisco, TX (US); Joe Vaughan, Lewisville, TX (US); PhaniKrishna Hari, The Colony, TX (US); Michael Garner, Carrollton, TX (US)

(73) Assignee: Capital One Services, LLC, McLean, VA (US)

( * ) Notice: Subject to any disclaimer, the term of this patent is extended or adjusted under 35 U.S.C. 154(b) by 230 days.

This patent is subject to a terminal disclaimer.

(21) Appl. No.: 17/449,738

(22) Filed: Oct. 1, 2021

(65) Prior Publication Data

US 2022/0019625 A1 Jan. 20, 2022

Related U.S. Application Data

(63) Continuation of application No. 16/531,392, filed on Aug. 5, 2019, now Pat. No. 11,138,268, which is a
(Continued)

(51) Int. Cl.
*G06F 16/90* (2019.01)
*G06F 16/903* (2019.01)
*G06F 16/18* (2019.01)

(52) U.S. Cl.
CPC .... *G06F 16/90335* (2019.01); *G06F 16/1865* (2019.01)

(58) Field of Classification Search
CPC ................ G06F 16/90335; G06F 16/1865
See application file for complete search history.

(56) References Cited

U.S. PATENT DOCUMENTS 6,961,708 B1 11/2005 Bierenbaum
7,389,256 B1 6/2008 Adams et al.
(Continued)

OTHER PUBLICATIONS

Tesselaar, et al., Banking Industry Architecture Network (BIAN), "Building the future of banking services," BIAN Semantic API Webinar, Nov. 21, 2016, 31 pages.
(Continued)

*Primary Examiner* — Loc Tran
(74) *Attorney, Agent, or Firm* — DLA PIPER LLP (US)

(57) ABSTRACT

In one aspect, the present disclosure relates to a system for improved transactional mainframes, the system comprising a processor, a database, an application programming interface (API) module, and a transaction import module. The API module can be configured to: receive transaction data comprising a transaction type, a user identifier, one or more transaction card identifiers, and one or more fields associated with the transaction card identifiers; validate the transaction data using one or more of the stored validation rules associated with the one or more transaction card identifiers; generate one or more transaction cards; and store the transaction data and transaction cards to the database. The transaction import module can be configured to submit the transaction cards to the mainframe, view the status of submitted records, and enable retrying of transaction cards that failed to process.

16 Claims, 4 Drawing Sheets

Related U.S. Application Data continuation of application No. 16/005,075, filed on Jun. 11, 2018, now Pat. No. 10,372,762.

(56) References Cited

U.S. PATENT DOCUMENTS

| | | |
|---|---|---|
| 8,776,021 B1 | 7/2014 | Suttle et al. |
| 2005/0071512 A1 | 3/2005 | Kim et al. |
| 2016/0307189 A1* | 10/2016 | Zarakas ............... G06K 19/02 |
| 2017/0171581 A1 | 6/2017 | Mulligan et al. |
| 2019/0197538 A1* | 6/2019 | Hamon ............... G06Q 20/027 |

OTHER PUBLICATIONS

FIS, "FIS Profile Core Banking Solution," FIS White Paper, Apr. 2017, 33 pages.

Ho, "Creating a RESTful Web Service for IMS-Transaction," IBM, Printed Apr. 24, 2018, 28 pages.

Ho, "Mainframe Modernization: Unleash the Power of Mainframe using API Economy," Infosys Blog, Nov. 15, 2016, 2 pages.

\* cited by examiner

SYSTEMS AND METHODS FOR IMPROVED TRANSACTIONAL MAINFRAMES

CROSS-REFERENCE TO RELATED APPLICATIONS

This is a continuation of U.S. application Ser. No. 16/531,392, filed Aug. 5, 2019, which is a continuation of U.S. application Ser. No. 16/005,075, filed Jun. 11, 2018, now U.S. Pat. No. 10,372,762, issued Aug. 6, 2019, which are incorporated by reference in its their entirety.

BACKGROUND

Many businesses rely on legacy mainframe computer systems for critical day-to-day operation. For example, many loan servicers use so-called "transaction card" mainframes for processing transactions related to issuing new loans and modifying existing loans. Mainframe systems may require that data be imported using a specific, proprietary data formats defined by the mainframe manufacture. For example, a transaction card mainframe may require that each transaction card be specified using a fixed-length string of characters with a defined set of options for each position in the string. Such data formats can be very difficult for humans to understand (i.e., not "human readable") and may require a highly customized programming to generate compliant data. On the other hand, modern end-user applications typically support flexible, open, and human-readable data formats such as JavaScript Object Notation (JSON) and Extensible Markup Language (XML), along with more modern application programming interfaces (APIs) such as Representational State Transfer (REST)-based APIs. Moreover, mainframe systems may be designed to import data in batches, for example using batch files that are processed only once per day. If the input data does not conform to the mainframe's rigidly-defined data format, this error may not be reported until the next business day. Further, existing transactional mainframes may not provide any capabilities for monitoring the status of submitted transactions, re-submitting failed transactions, or rolling back transactions.

SUMMARY

According to one aspect, the present disclosure relates to a system for improved transactional mainframes, the system including a processor, a database, an application programming interface (API) module, and a transaction import module. The database may be configured to store validation rules for one or more transaction card data formats supported by a transactional mainframe. The API module may be configured for execution on the processor to:
receive, from an application executing on a computing device, transaction data including a transaction type, a user identifier associated with the application, one or more transaction card identifiers, and one or more fields associated with the transaction card identifiers, the transaction data having a data format different from the one or more transaction card data formats supported by the transactional mainframe; validate the transaction data using one or more of the stored validation rules associated with the one or more transaction card identifiers; generate one or more transaction cards based on the validated transaction data; store the transaction data and transaction cards in the database; and send a success response to the application. The transaction import module may be configured for execution on the processor to: submit the transaction cards to the transactional mainframe; determine that a first one of the transaction cards was successfully imported into the transactional mainframe; and store, to the database, an indication that the first one of the transaction cards was successfully imported into the transactional mainframe.

In some embodiments, the system can include one or more scheduling modules configured for execution on the processor to: determine a batch transaction import should run based on a current time and a predetermined import schedule; and signal to the transaction import module to run a batch transaction import. The transaction import module can be configured to, in response to being signaled by the one or more scheduling modules: query the database for one or more transaction cards that have not been successfully imported into the transactional mainframe; and submit the one or more transaction cards that have not been successfully imported into the transactional mainframe. In some embodiments, the transaction import module is configured to: generate a batch file including the one or more transaction cards that have not been successfully imported into the transactional mainframe; and import the batch file into the transactional mainframe. In some embodiments, the transaction import module can be configured to group related transaction cards together within the batch file.

In some embodiments, the transaction data can have a data format that is one of JavaScript Object Notation (JSON) or Extensible Markup Language (XML). In some embodiments, the one or more transaction card data formats can include a fixed-length string of characters with a defined set of options for each position in the string. In some embodiments, the transaction data can include two or more transaction card identifiers. In some embodiments, the stored validation rules associated with the one or more transaction card identifiers can include a rule specifying that transaction data must include one required fields and a rule specifying that transaction data may include one or more optional fields. In some embodiments, the transaction import module is configured to: determine that a second one of the transaction cards failed to import into the transactional mainframe; and store, to the database, an indication that the second one of the transaction cards failed to import into the transactional mainframe. In some embodiments, the system can include a user interface (UI) module configured for execution on the processor to: present one or more UI controls for re-submitting transactions that failed to import into the transactional mainframe; and present one or more UI controls for rolling back transactions that were successfully imported into the transactional mainframe.

According to one aspect, the present disclosure relates to a method for improving transactional mainframe systems, the method including: receiving, from an application executing on a computing device, transaction data including a transaction type, a user identifier associated with the application, one or more transaction card identifiers, and one or more fields associated with the transaction card identifiers, the transaction data having a data format different from the one or more transaction card data formats supported by a transactional mainframe; retrieving, from a database, validation rules for one or more transaction card data formats supported by a transactional mainframe; validating the transaction data using one or more of the stored validation rules associated with the one or more transaction card identifiers; generating one or more transaction cards based on the validated transaction data; storing the transaction data and transaction cards in the database; sending a success response to the application; submitting the transaction cards to the transactional mainframe; determining that a first one of the transaction cards was successfully imported into the transactional mainframe; and storing, to the database, an indication that the first one of the transaction cards was successfully imported into the transactional mainframe.

In some embodiments, the method can include: determining a batch transaction import should run based on a current time and a predetermined import schedule; and in response to determining the batch transaction import should run: querying the database for one or more transaction cards that have not been successfully imported into the transactional mainframe, and submitting the one or more transaction cards that have not been successfully imported into the transactional mainframe. In some embodiments, the method can include: generating a batch file including the one or more transaction cards that have not been successfully imported into the transactional mainframe; and importing the batch file into the transactional mainframe. In some embodiments, the method can include grouping related transaction cards together within the batch file.

In some embodiments, the transaction data can have a data format that is one of JavaScript Object Notation (JSON) or Extensible Markup Language (XML). In some embodiments, the one or more transaction card data formats can include a fixed-length string of characters with a defined set of options for each position in the string. In some embodiments, the transaction data can include two or more transaction card identifiers. In some embodiments, the method can include: determining that a second one of transaction cards failed to import into the transactional mainframe; and storing, to the database, an indication that the second one of the transaction cards failed to import into the transactional mainframe. In some embodiments, the method can include, in response to user input, re-submitting the second one of the transaction cards to the transactional mainframe.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

The drawings are not necessarily to scale, or inclusive of all elements of a system, emphasis instead generally being placed upon illustrating the concepts, structures, and techniques sought to be protected herein.

DETAILED DESCRIPTION

Embodiments of the present disclosure may provide for improved transactional mainframe systems. A transaction management server can be coupled between a legacy mainframe and one or more end-user applications. The server may provide a bridge between the mainframe's proprietary interfaces and modern, open data formats and application programming interfaces (APIs) that are more readily supported by end-user applications. In some embodiments, the server may provide real-time validation of transaction data to end-user applications, while performing non-real-time and/or batch imports to the mainframe. Some embodiments of the present disclosure provide a REST-based ("RESTful") API wrapper that enables easier communication with transaction card mainframes. Systems and methods disclosed herein can reduce the time and cost required to develop end-user applications that rely on legacy mainframes, while providing improved performance and reliability.

Figure 1:
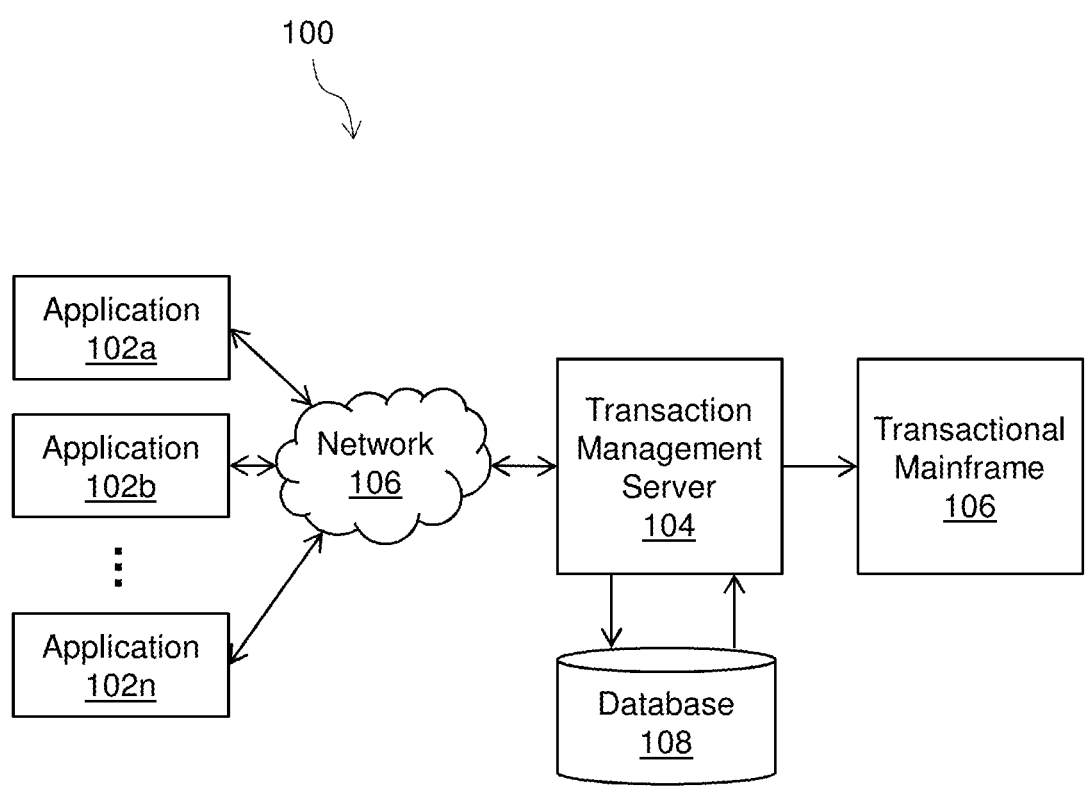
FIG. 1 is a diagram showing a system for improving transactional mainframes, according to some embodiments of the present disclosure.

FIG. 1 shows a system 100 for improving transactional mainframes, according to some embodiments of the present disclosure. The system 100 includes one or more end-user applications 102a . . . 102n, a transaction management server 104, a transactional mainframe 108, and a database 108. The various components of the system 100 may be connected as shown in FIG. 1 or in any other suitable manner. The system components may be connected by one or more wireless or wireline computer networks. For example, end-user applications 102a . . . 102n (102 generally) may be coupled to the transaction management server 104 via network 106.

The transactional mainframe 106 may correspond to a legacy mainframe system, such as a transaction card mainframe used by loan servicers or other entities. The term "transaction card" may refer a collection of data which can be imported into a transactional mainframe. A transactional mainframe may support many different types of transactions, with each type of transaction including one or more transaction cards.

The mainframe 106 may be designed for processing loan transactions, e.g., home loan transactions. The mainframe 106 may require that data be imported using various character-based data formats depending on the type of transaction or transaction card being imported. For example, the system may prescribe a certain data format when changing a power of attorney associated with a loan, while requiring a different data format when adjusting an equity line of credit. The mainframe 106 may be designed to import transaction cards via batch files on a relatively infrequent basis (e.g., once per day) and mandate that transaction cards have a particular ordering within a batch file (e.g., mandate that related transaction cards be grouped together within the batch file). In some embodiments, the transactional mainframe 106 may correspond to a mainframe system distributed by BLACK KNIGHT® FINANCIAL SERVICES.

The end-user applications 102 may include any types of applications that generate transaction data to be processed by the mainframe 106. In some embodiments, applications 102 may include a home loan servicing application that has a user interface (UI) for setting up new home loans and for modifying existing home loans. For example, an application 102 may include a UI for adding a power of attorney to a particular home loan, or for removing power of attorney from a loan. As another example, an application 102 may include a UI for updating successors in interest for a home loan. Instead of sending transaction cards directly to the transactional mainframe 106 using proprietary data formats mandated by the mainframe 106, applications 102 can send transaction data to the transaction management server 104 using open data formats and protocols, such as JSON and REST. Transaction management server 104 can use techniques discussed below to convert the transaction data into one or more transaction cards, and automatically imports those transaction cards into the mainframe 106 in a reliable and transparent fashion.

Applications 102 may utilize client libraries 110 (shown in FIG. 2) to facilitate sending transaction data to the management server 104. For example, client libraries 110 can include a Hypertext Transfer Protocol (HTTP) client library, a JSON encoder, an XML builder library, etc.

Figure 2:
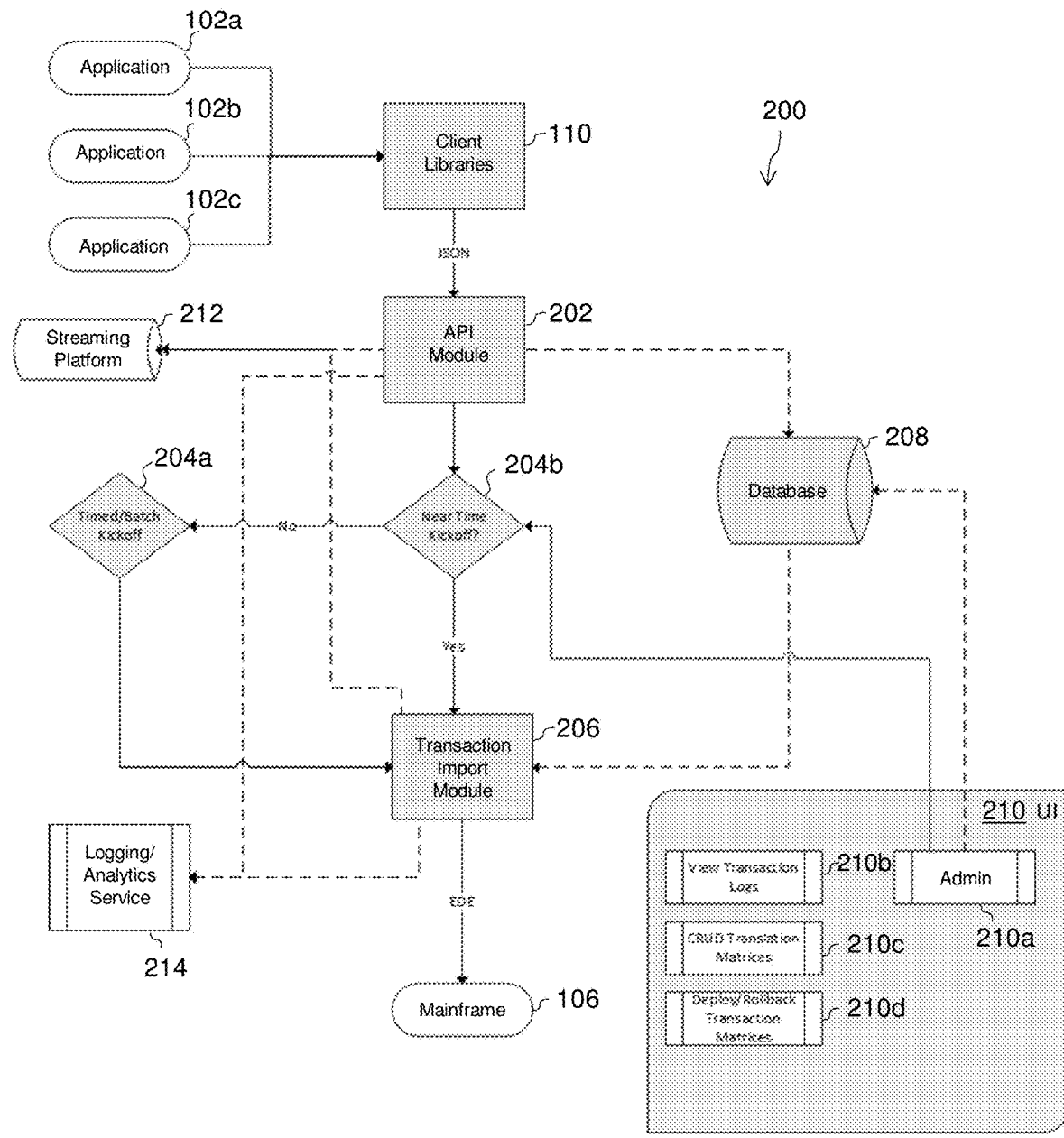
FIG. 2 is a diagram showing a transaction management server that may be used within the system of FIG. 1, according to some embodiments of the present disclosure.

FIG. 2 shows a transaction management server (or "management server") 200, according to some embodiments of the present disclosure. The illustrative management server 200, which may be used within the system 100 of FIG. 1, includes an API module 202, scheduling modules 204a and 204b (204 generally), a transaction import module 206, database 208, and a user interface (UI) module 210. Each of the management server components 202-210 may include hardware and/or software configured to perform the processing described herein below.

API module 202 may be configured to receive transaction data from end-user applications 102 in one or more different formats, such as JSON or XML. API module 202 may provide a REST-based API which the applications can use to send transaction data to the management server 200. In some embodiments, the JSON format may include one or more of the following fields: a field that specifies the type of transaction to be created (TRANSACTION ID); a field representative of the requesting application (CHANNEL); a field that identifies one or more transaction cards (CARDS), wherein the permissible values may depend on the specified transaction type; and a TRANSACTION field that includes the payload data for the specified transaction cards.

TABLE 1

```
{
  "TRANSACTION_ID": "5NB",
  "CHANNEL": "sat",
  "CARDS": ["A"],
  "TRANSACTION": {
    "EXPANDED_LOAN_NUMBER": "43080066",
    "USER_ID": "84p",
    "RECORD_NUMBER": "01",
    "NON_BORROWER_FULL_NAME": "lastname#firstname#middlename",
    "SSN_TIN": "123456789",
    "DATE_OF_BIRTH": "01011970",
    "COUNTRY_OF_CITIZENSHIP": "US",
    "PROPERTY_OCCUPANCY": "Y",
    "PROPERTY_OCCUPANCY_DATE": "101317"
  }
}
```

TABLE 1 shows an example of transaction data (formatted as JSON) that may be received from a home loan servicing application 102. In particular, TABLE 1 may correspond to a request to add/update successors in interest for a particular home loan. This type of transaction (denoted "5NB") may be associated with one or more transaction cards. In the example of TABLE 1, transaction card "A" may correspond to non-borrower information. For this particular card, information specified in the TRANSACTION field can include a loan number (EXPANDED_LOAN_NUMBER), an identifier for a user updating the loan (USER_ID), a full name of the non-borrower (NON_BORROWER_FULL_NAME), the non-borrower record number to be added/updated (RECORD_NUMBER), a social security or tax identification number of the non-borrower (SSN_TIN), the non-borrower's date of birth (DATE_OF_BIRTH), the non-borrower's country of citizenship (COUNTRY_OF_CITIZENSHIP), an indication of whether the non-borrower occupies the property (PROPERTY_OCCUPANCY), and the date the non-borrower started occupying the property (PROPERTY_OCCUPANCY_DATE).

The illustrative transaction type and transaction card represented by TABLE 1 is merely one of many different types of transactions supported by the mainframe 106. For example, there may be a separate transaction type for adjusting an equity line of credit and/or for adjusting interest accrual for a loan. In general, the payload data (TRANSACTION) can include one or more fields that relate to the identified transaction cards (CARDS). Some fields may be optional, such as SSN_TIN or DATE_OF_BIRTH, whereas other fields may be required, such as EXPANDED_LOAN_NUMBER. If multiple transaction cards are specified, then the payload data can include fields common to all transaction cards, along with fields that are specific to a subset of the cards. For example, EXPANDED_LOAN_NUMBER and USER_ID may be common to several different transaction cards.

The database 208 can store validation rules for the various types of transactions supported by the mainframe 106. Database 208 may store the set of required fields and the set of optional fields for particular transaction types, along with validation rules for a particular field. For example, a validation rule may indicate that the USER_ID field is required for all transaction types. As another example, a validation rule may indicate that the EXPANDED_LOAN_NUMBER field must contain a numeric value. Database 208 may store validation rules that are specific to a particular transaction card. For example, a stored validation rule may indicate that card "D" is required to have a NON_BORROWER_FULL_NAME field.

API module 202 can use the validation rules stored in database 208 to validate transaction data received from applications 102. If received transaction data does not comply with the relevant validation rules, API module 202 may immediately return an error response to the application 102, which allows the application 102 to provide real-time feedback to users in the case of incorrect or invalidate request data. If the transaction data received from an application 102 is determined to be valid, then API module 202 may store the validated transaction data in the database 208. API module 202 may also generate one or more transaction cards based on the transaction data. The generated transaction cards may be have a proprietary data format specified by the mainframe 106, such as a format having a fixed length string of characters with a defined set of options for each position in the string. For example, for the example transaction data shown in TABLE 1, API module 202 may generate the following transaction card:

| | | |
|---|---|---|
| "5NB384* | A lastname#firstname#middlename | |
| 123456789 01011970US | | 0000043080066 |
| 0184pY101317 | | " |

The generated transaction cards may be stored in the database 208 along with the validated transaction data. In some embodiments, an application may send data for multiple transactions and/or multiple transaction cards in a single payload. The API module 202 may generate and store multiple transaction cards as appropriate.

Scheduling modules 204 may be configured to determine when transaction cards should be submitted to the mainframe 106. In some embodiments, the management server 200 may submit transactions to the mainframe in batches, according to a configurable schedule ("import schedule"). In some embodiments, the import schedule may be stored within the database 208 where it can be modified by the UI module 210 and read by the scheduling modules 204. The import schedule may specify that batch transaction imports should run, for example, Monday through Friday at 6:00 PM, or at any other desired days and times.

As shown in FIG. 2, management server 200 may include a first scheduling module 204a and a second scheduling module 204b. First scheduling module 204a can compare the server's current time against the import schedule to determine if it is time for a batch import. First scheduling module 204a can signal the transaction import module 206 to perform (or "kickoff") a batch import. Second scheduling module 204b may be configured for uploading transactions in real-time or near real-time. In this way, module 204b may not utilize batch uploading but, instead, it may submit a transaction to the mainframe as soon as it arrives.

In response to being signaled by the scheduling modules 204 and/or API module 202, transaction import module 206 may retrieve one or more transaction cards from the database 208, perform any necessary data transformations, and submit the transaction cards to the mainframe. In some embodiments, transaction import module 206 queries the database 208 for one or more transaction cards that have not yet been successfully submitted to the mainframe 106. Transaction import module 206 can generate a batch file including all such transaction cards, where the batch file has a file format accepted by the mainframe system 106. For example, transaction import module 206 may add a file header to the batch file if required by the mainframe. Some mainframe systems 106 may require that related transaction cards (e.g., two or more transaction cards associated with the same loan number) be grouped together within a batch file. Accordingly, transaction import module 206 may re-order transaction cards within the batch file as needed.

Transaction import module 206 may submit the batch file to the mainframe using a command-line tool or other type of tool provided for use with the mainframe. In some embodiments, transaction import module 206 may write batch files to a file store that is accessible to the mainframe 106 and then issue a command to the mainframe to process the batch file. Transaction import module 206 can monitor the mainframe 206 to determine which transaction cards have been successfully imported and which failed to import. The module 206 may store information about the import status of each transaction card within the database 208.

In some embodiments, the management server 200 may include, or otherwise be coupled to, a streaming platform 212. Streaming platform 212 may have various capabilities, for example: (1) publish and subscribe to streams of records, similar to a message queue or enterprise messaging system; (2) store streams of records in a fault-tolerant durable way; and (3) process streams of records as they occur. The management server 200 can use the streaming platform 212 to coordinate transaction processing. For example, API module 202 may send a message to streaming platform 212 when a transaction card is added to the database 208, wherein the message includes a unique identifier or other information that can be used to retrieve the transaction card from database 208. In turn, transaction import module 206 can query streaming platform 212 to retrieve a list of transaction card identifiers and use this information to retrieve corresponding card data from database 208. In some embodiments, the streaming platform 212 may be based on the APACHE KAFKA® streaming platform.

In some embodiments, management server 200 may include, or otherwise be coupled to, a logging/analytics service 214 which can be used to view statistical information related to transaction cards processed by the server 200. API module 202 can send the logging/analytics service 214 information about transaction cards received from client applications 102. Likewise, transaction import module 206 can send the logging/analytics service 214 status information about transactions submitted to the mainframe 106. Information recorded can have various uses, including: detailing usage history; tracking failed requests and debugging related failure modes; recording the submission status of a batch and cause of previous batch upload failures (i.e. network issues).

The UI module 210 can include an admin UI 210a, a transaction log UI 210b, a Create-Read-Update-Delete (CRUD) translation matrices UI 210c, and a deploy/rollback transaction matrices UI 210d. Admin UI 210a may provide various administrative controls. For example, admin UI 210a may include controls for adding/modifying validation rules stored in database 208 and used by API module 202 for validating transaction data. As another example, admin UI 210a may include controls for modifying the import schedule stored in database 208 and used by scheduling modules 204. As yet another example, admin module 210a may include controls for rolling back transactions that were previously imported to the mainframe 106, or re-submitting transactions that previously failed to import into the mainframe 106.

Some transactions can be used to add or remove information from a record. For such transactions, rollback functionality can be implemented through the API by determining what information was added/removed in a specific transaction and submitting a subsequent transaction to revert the prior transaction. As an example, an add transaction can be counteracted by a corresponding delete operation. Rollback on the latest update or delete transactions can be achieved by re-submitting the entire recorded history of a transaction omitting the latest transaction to restore the previous state of a record. This form of rollback requires that all updates to the account details recorded in the transaction were modified through the API.

Transaction log UI 210b can be configured to view logging information generated by the management server 200, such as logging information sent to the logging/analytics service 214.

CRUD translation matrices UI 210c may be used to add, modify, and remove information used to translate API requests into transaction cards. A "translation matrix" may be used by the API module 202 to translate fields in a JSON/XML request into fields used by the mainframe. For example, the API may allow applications to specify a person's date of birth using the field "Date of Birth" and translate this to "DATE_OF_BIRTH" before submitting a transaction card to the mainframe.

Deploy/rollback transaction matrices UI 210d can be used to view status information about transactions processed by the server 200. For example, UI 210c may display information about which transactions have been successfully submitted to the mainframe 106, which transactions have failed to import to the mainframe 106, and which transactions have been rolled back. The UI 210d may also be used to re-submit specific transactions or schedule certain transactions to be submitted at a later date.

Figure 3:
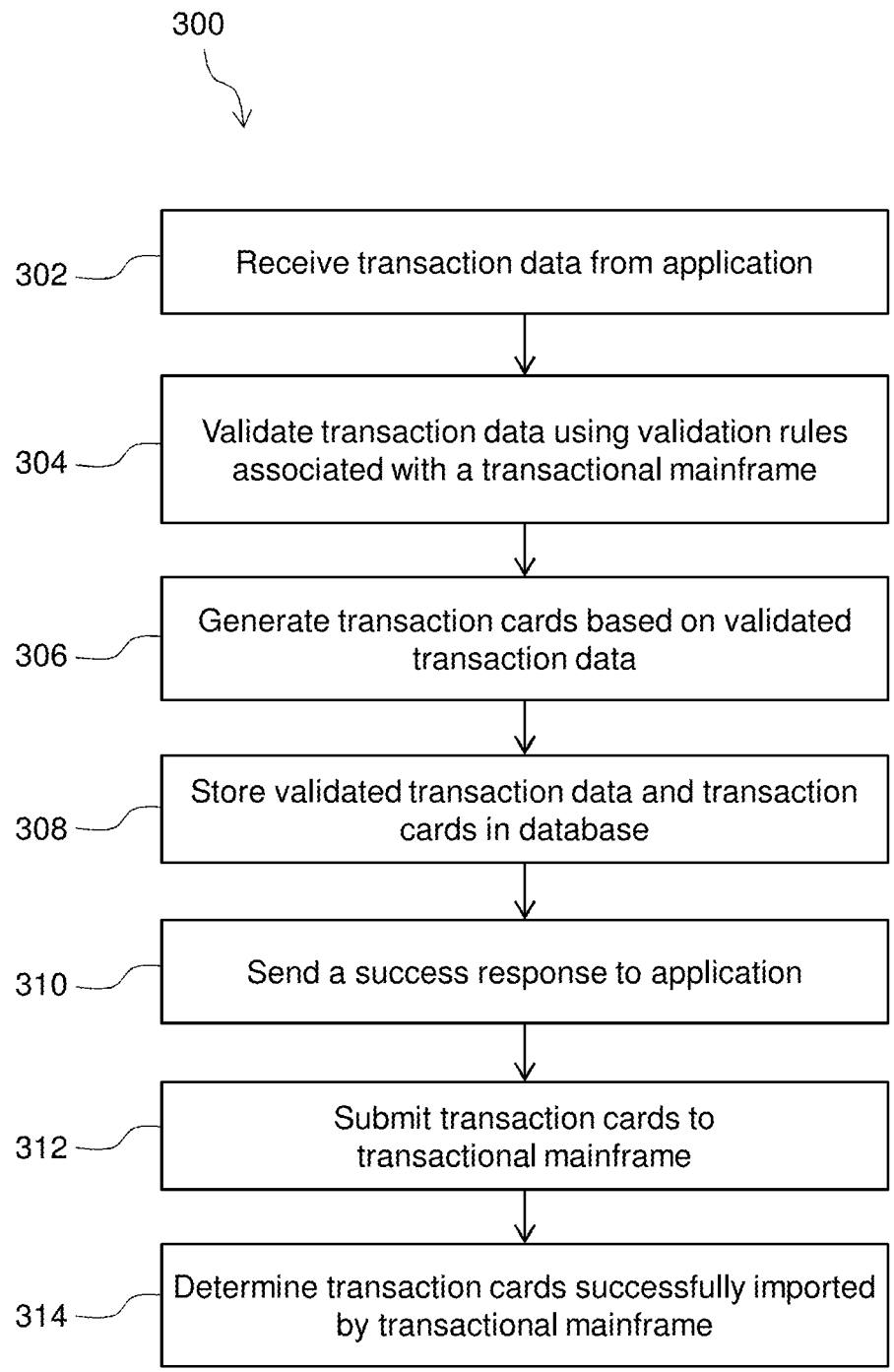
FIG. 3 is a flow diagram showing processing that may occur within the system of FIG. 1, according to some embodiments of the present disclosure.

FIG. 3 shows an illustrative a method 300 for improving transactional mainframe systems, according to embodiments of the present disclosure. The method 300 can be performed by a transaction management server, such as server 104 in FIG. 1, coupled to a transactional mainframe system, such as mainframe 106 in FIG. 1. The management server may include a database configured to store validation rules for one or more transaction card data formats supported by a transactional mainframe.

At block 302, transaction data may be received from an end-user application executing on a computing device. The transaction data can include a transaction type, a user identifier associated with the application, one or more transaction card identifiers, and one or more fields associated with the transaction card identifiers. The transaction data can have a data format that is different from the transaction card data formats supported by the mainframe. At block 304, the received transaction data may be validated using stored validation rules that are associated with the identified transaction card. At block 306, one or more transaction cards can be generated based on the validated transaction data and, at block 308, the transaction cards may be stored in the database. In some embodiments, method 300 can validate transaction data and generate transaction cards using techniques discussed above in conjunction with FIG. 2. At block 310, a success response may be sent to the application. In some embodiments, blocks 302-310 can be performed by an API module, such as module 202 in FIG. 2.

At block 312, the transaction cards can be submitted to the mainframe. In some embodiments, this may include generating a batch file having a plurality of transaction cards and using a command-line tool (or other type of tool provided with the mainframe) to import the batch file into the mainframe. In some embodiments, related transaction cards (e.g., transaction cards associated with the same loan number) may be grouped together within the batch file. At block 314, a determination can be made as to which transaction cards were successfully imported into the mainframe and which transaction cards were not. In some embodiments, the database may be updated to indicate the import status for each of the transaction cards. The import status may include, for example, a success/failure indication and a descriptive error message in the case of a failure. In some embodiments, blocks 312 and 314 can be performed by a transaction import module, such as module 206 in FIG. 2.

Figure 4:
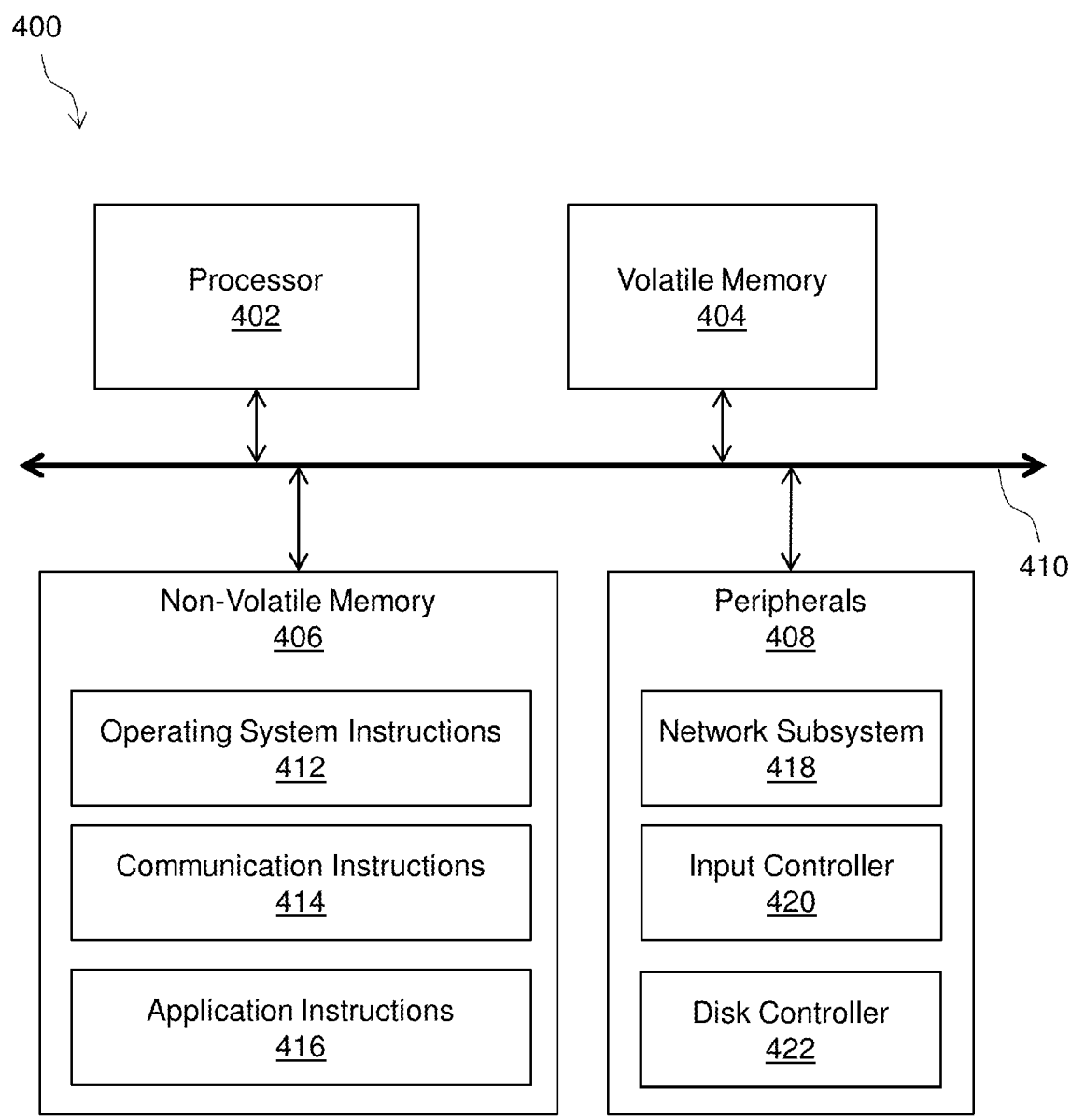
FIG. 4 is a block diagram of an illustrative computing device, according to some embodiments of the present disclosure.

FIG. 4 shows an illustrative server device 400 that may implement various features and processes as described herein. The server device 400 may be implemented on any electronic device that runs software applications derived from compiled instructions, including without limitation personal computers, servers, smart phones, media players, electronic tablets, game consoles, email devices, etc. In some implementations, the server device 400 may include one or more processors 402, volatile memory 404, non-volatile memory 406, and one or more peripherals 408. These components may be interconnected by one or more computer buses 410.

Processor(s) 402 may use any known processor technology, including but not limited to graphics processors and multi-core processors. Suitable processors for the execution of a program of instructions may include, by way of example, both general and special purpose microprocessors, and the sole processor or one of multiple processors or cores, of any kind of computer. Bus 410 may be any known internal or external bus technology, including but not limited to ISA, EISA, PCI, PCI Express, NuBus, USB, Serial ATA or FireWire. Volatile memory 404 may include, for example, SDRAM. Processor 402 may receive instructions and data from a read-only memory or a random access memory or both. The essential elements of a computer may include a processor for executing instructions and one or more memories for storing instructions and data.

Non-volatile memory 406 may include by way of example semiconductor memory devices, such as EPROM, EEPROM, and flash memory devices; magnetic disks such as internal hard disks and removable disks; magneto-optical disks; and CD-ROM and DVD-ROM disks. Non-volatile memory 406 may store various computer instructions including operating system instructions 412 and application instructions 414. Operating system instructions 412 may include instructions for implementing an operating system (e.g., Mac OS®, Windows®, or Linux). The operating system may be multi-user, multiprocessing, multitasking, multithreading, real-time, and the like. The operating system instructions 412 may include network communications instructions, for example, software for implementing communication protocols, such as TCP/IP, HTTP, Ethernet, telephony, etc. Application instructions 414 can include instructions for improving transactional mainframe systems. For example, application instructions 414 may include instructions for transaction management server modules 202-206 described above in conjunction with FIG. 2. Application data 416 may correspond to data stored by the applications running on the server device 400. For example, Application data may 416 may include transaction data, configuration data, and other data stored within database 208 as described above in conjunction with FIG. 2.

Peripherals 408 may be included within the server device 400 or operatively coupled to communicate with the sever device 400. Peripherals 408 may include, for example, network interfaces 418, input devices 420, and storage devices 422. Network interfaces may include for example an Ethernet or WiFi adapter. Input devices 420 may be any known input device technology, including but not limited to a keyboard (including a virtual keyboard), mouse, track ball, and touch-sensitive pad or display. Storage devices 422 may include one or more mass storage devices for storing data files; such devices include magnetic disks, such as internal hard disks and removable disks; magneto-optical disks; and optical disks.

Methods described herein may represent processing that occurs within a system for improved transactional mainframes (e.g., system 100 of FIG. 1). The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, such as EPROM, EEPROM, flash memory device, or magnetic disks. The processor and the memory can be supplemented by, or incorporated in, special purpose logic circuitry.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A method, comprising:
  receiving, by an application programming interface (API) module from an end-user application, transaction data via a first format, the transaction data to be processed by a transactional mainframe, wherein the first format is not compatible with the transactional mainframe;
  validating, by the API module, the transaction data by comparing the transaction data against stored validation rules associated with a type of data corresponding to the transaction data;
  upon validating the transaction data, converting, by the API module, the transaction data into a transaction card, wherein the transaction card has a second format compatible with the transactional mainframe; and
  importing, by a transaction import module, the transaction card into the transactional mainframe, the importing comprising:
    writing a batch file comprising the transaction card to a file store accessible by the transactional mainframe, and
    issuing a command to the transactional mainframe to process the batch file.

2. The method of claim 1, wherein validating, by the API module, the transaction data comprises:
  identifying whether the transaction data satisfies a set of rules for one or more fields in the transaction data.

3. The method of claim 1, wherein the transaction data comprises multiple transactions.

4. The method of claim 3, wherein converting, by the API module, the transaction data into the transaction card comprises:
  for each transaction of the multiple transactions, converting the transaction into a respective transaction card.

5. The method of claim 1, further comprising:
  sending, by the API module, a message to a streaming platform when the transaction card is created; and
  querying, by the transaction import module, the streaming platform to retrieve a list of transaction card identifiers for retrieving corresponding card data.

6. The method of claim 1, further comprising:
  sending, by the API module, information related to the transaction card to a logging service;
  sending, by the transaction import module to the logging service, status information about the transaction submitted to the transactional mainframe; and
  recording, by the logging service, the information related to the transaction card and the status information about the transaction.

7. A non-transitory computer readable medium comprising one or more sequences of instructions, which, when executed by a processor, causes a computing system to perform operations, comprising:
  receiving, by an application programming interface (API) module from an end-user application, transaction data via a first format, the transaction data comprising a plurality of transactions to be processed by a transactional mainframe, wherein the first format is not compatible with the transactional mainframe;
  validating, by the API module, the transaction data by comparing each transaction in the transaction data against stored validation rules associated with a type of data corresponding to the transaction data;
  upon validating a transaction in the transaction data, converting, by the API module, a subset of transaction data for the validated transaction into a transaction card, wherein the transaction card has a second format compatible with the transactional mainframe;
  storing, by the API module, the transaction card into a database; and
  importing, by a transaction import module, the transaction card into the transactional mainframe, the importing comprising:
    writing a batch file comprising the transaction card to a file store accessible by the transactional mainframe, and
    issuing a command to the transactional mainframe to process the batch file.

8. The non-transitory computer readable medium of claim 7, further comprising:
upon validating the transaction data, storing, by the API module, the validate transaction data.

9. The non-transitory computer readable medium of claim 7, wherein validating, by the API module, the transaction data comprises:
identifying whether the subset of transaction data for the transaction satisfies a set of rules for one or more fields in the transaction data.

10. The non-transitory computer readable medium of claim 7, further comprising:
determining, by the API module, that a second transaction of the plurality of transactions in the transaction data does not satisfy a validation rule; and
based on the determining, returning, by the API module, an error response.

11. The non-transitory computer readable medium of claim 7, wherein the second format comprises a fixed length string of characters with a defined set of options for each position in the fixed length string of characters.

12. The non-transitory computer readable medium of claim 7, further comprising:
sending, by the API module, a message to a streaming platform when the transaction card is created; and
querying, by the transaction import module, the streaming platform to retrieve a list of transaction card identifiers for retrieving corresponding card data.

13. A system comprising:
a processor; and
a memory having programming instructions stored thereon, which, when executed by the processor, causes the system to perform operations comprising:
receiving, by an application programming interface (API) module from an end-user application, transaction data via a first format, the transaction data to be processed by a transactional mainframe, wherein the first format is not compatible with the transactional mainframe;
validating, by the API module, the transaction data by comparing the transaction data against stored validation rules associated with a type of data corresponding to the transaction data;
upon validating the transaction data, converting, by the API module, the transaction data into a transaction card, wherein the transaction card has a second format compatible with the transactional mainframe; and
importing, by a transaction import module, the transaction card into the transactional mainframe, the importing comprising:
writing a batch file comprising the transaction card to a file store accessible by the transactional mainframe, and
issuing a command to the transactional mainframe to process the batch file.

14. The system of claim 13, wherein validating, by the API module, the transaction data comprises:
identifying whether the transaction data satisfies a set of rules for one or more fields in the transaction data.

15. The system of claim 13, wherein the operations further comprise:
sending, by the API module, a message to a streaming platform when the transaction card is created; and
querying, by the transaction import module, the streaming platform to retrieve a list of transaction card identifiers for retrieving corresponding card data.

16. The system of claim 13, wherein the operations further comprise:
sending, by the API module, information related to the transaction card to a logging service;
sending, by the transaction import module to the logging service, status information about the transaction submitted to the transactional mainframe; and
recording, by the logging service, the information related to the transaction card and the status information about the transaction.

\* \* \* \* \*